United States Patent [19]

Cantou

[11] Patent Number: 4,467,357

[45] Date of Patent: Aug. 21, 1984

[54] SYSTEM FOR DIGITIZING AND PROCESSING VIDEO SIGNALS AND A TELEVISION SIGNAL RECEIVER COMPRISING SUCH A SYSTEM

[75] Inventor: Christian Cantou, Combs-La-Ville, France

[73] Assignee: La Radiotechnique, Suresnes, France

[21] Appl. No.: 381,087

[22] Filed: May 24, 1982

[30] Foreign Application Priority Data

Jun. 19, 1981 [FR] France ................................ 81 12122

[51] Int. Cl.$^3$ .............................................. H04N 5/04
[52] U.S. Cl. .................................................. 358/148
[58] Field of Search ............... 358/320, 339, 153, 160, 358/148

Primary Examiner—John C. Martin
Assistant Examiner—Victor R. Kostak
Attorney, Agent, or Firm—Thomas A. Briody; William J. Streeter; Edward W. Goodman

[57] ABSTRACT

System for digitizing and processing video signals incorporating a circuit (14) for separating the line synchronizing signals from an input video signal, a digital store for this input video signal, a write control circuit (18) for writing the input video signal into the store, a circuit (12) for processing the signals stored in the store and a read control circuit (22) for reading from the store and regaining an output video signal. This system includes a self-contained clock circuit formed by an oscillator (20) whose output signal is conveyed to the write control circuit (18), the read control circuit (22) and a delay counter (21), which gives the line synchronizing signal a delay which is equal to an integral number of times the line period, the output signal of the circuit (14) being conveyed to the read control circuit (22) after having passed through the counter (21).

2 Claims, 3 Drawing Figures

SYSTEM FOR DIGITIZING AND PROCESSING VIDEO SIGNALS AND A TELEVISION SIGNAL RECEIVER COMPRISING SUCH A SYSTEM

BACKGROUND OF THE INVENTION

The present invention relates to a system for digitizing and processing video signals, as well as to a television signal receiver comprising such a system.

When, for example in a television signal transmission system, a line processing sequence is required, which consequently implies storing the original video signal in a store and, after processing, regaining the video signal with a delay of one or more line periods, the system must incorporate a sampling clock. In order to avoid a shift of the sampling action from line to line, which would cause horizontal fringes to appear in the television picture, this clock may be formed by a phase-locked loop which, as shown in FIG. 1 and described in detail hereinafter, includes an oscillator whose frequency is controlled by a d.c. voltage, a frequency divider adjusting said frequency to the line frequency, a phase comparator whose output supplies the d.c. voltage which controls the oscillator frequency (to ensure a phase-equality between the line synchronizing signals and the signals obtained by means of frequency division from the oscillator signal) and by a filter which, means of integration, prevents sudden changes from occurring.

The stability of the oscillator is then, however, usually insufficient between two consecutive comparisons to result in a faultless display of a television picture. When, for example, the composite video signal is digitized and processed, the instantaneous instabilities of the oscillator are shown in the signal to be displayed after processing, as phase transients which are displayed after demodulation as very annoying smears of 1 to 2 cm in the picture. Moreover, the sensitivity to interferences from the power supply is high. The elimination of these interferences is difficult and too costly for large-scale manufacture.

SUMMARY OF THE INVENTION

It is an object of the invention to provide a system in which these disadvantages are mitigated and which consequently has a high degree of stability and can be easily used, so that it is suitable for incorporation in mass-produced apparatus.

To this end, the invention relates to a system for digitizing and processing video signals, comprising a circuit for separating the line synchronizing signals from an input video signal, a digital store for this input video signal, a write control circuit for writing in the store, a circuit for processing the signals stored in the store, and a display control circuit for reading from the store and displaying an output video signal, characterized in that:

it comprises a clock circuit which is independent of the line synchronizing signals and comprises an oscillator whose output signal is conveyed to the write control circuit, to the display control circuit and to a delay counter;

this counter delaying the line synchronizing signals by an amount equal to an integral number of times the television line period;

the output signals of the circuit for separating the line synchronizing signals, which are conveyed directly to the write control circuit, being conveyed to the display control circuit after having passed through the counter.

Since the line synchronizing signal which is separated from the input video signal is subjected to temporary changes ("jitter") around the theoretical line period duration of 64 microseconds, the start of the writing control circuit for writing into a memory is also irregular, at instants which deviate one or more sampling clock periods from the theoretical line period. If starting the display control circuit for reading the memory would be effected by the same synchronizing signal which is separated from the original video signal, a shift from one line to the other of the displayed video signal would appear in the television picture. The presence of the delay counter renders it possible to form for the display control circuit a starting pulse which is very accurately delayed by an integral number of line periods with respect to the starting pulse of the write control circuit. As a result thereof any shift in the start of writing procedure also occurs in the display, so that deficiences in the picture due to said shift are prevented from occurring.

DESCRIPTION OF THE DRAWINGS

The invention will now be described in greater detail by way of non-limitative example with reference to the accompanying drawings.

DESCRIPTION OF THE PREFERRED EMBODIMENT

Figure 1:
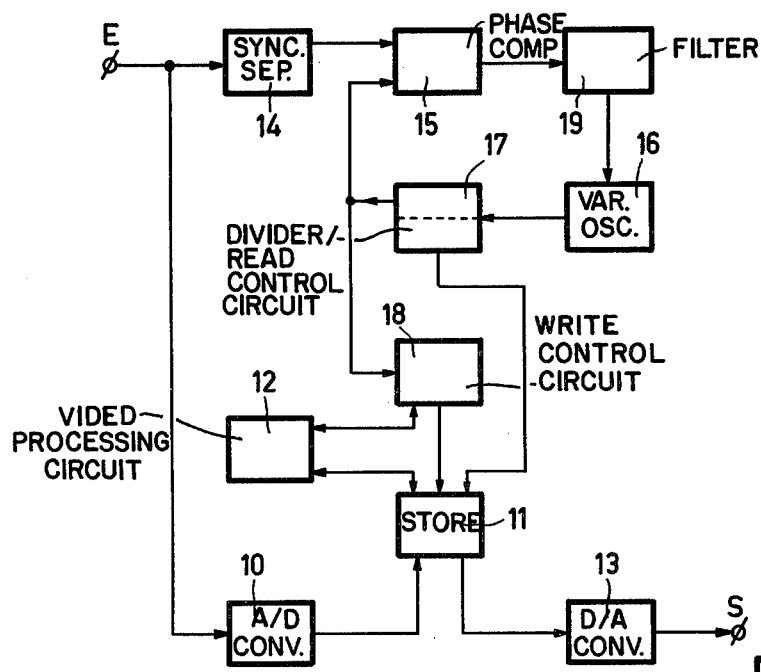
FIG. 1 shows an embodiment of a prior art system.

In the prior art system shown in FIG. 1, a video signal supplied at E is stored in a store 11 after an analog-to-digital conversion in a converter 10. After having been processed in a circuit 12 (in the present case the nature of this processing operation is not so important and is not the subject of the invention and cannot limit the invention so that no further description is required here) and after having been conveyed through the digital-to-analogue converter 13 an output video signal is regained at S. The sampling clock, which is in synchronization with the line synchronizing signals produced by a separator 14, is formed by a phase-locked loop incorporating a phase comparator 15, which at a first input receives the line synchronizing signals and at a second input receives the output signals of the loop which, as shown hereafter, are supplied by a circuit 17, an oscillator 16 whose frequency is controlled by the output d.c. voltage of the comparator 15, which voltage is conveyed through a filter 19. The circuit 17 is a frequency divider and read out control circuit whose output is connected to the second input of the comparator 15 and to the input of a write control circuit 18 (which itself is connected to the store 11 and to the processing circuit 12), and also to the store 11. The filter 19 is provided between the comparator 15 and the oscillator 16 to absorb excessively sudden changes by integration of the phase deviations on different lines.

Figure 2:
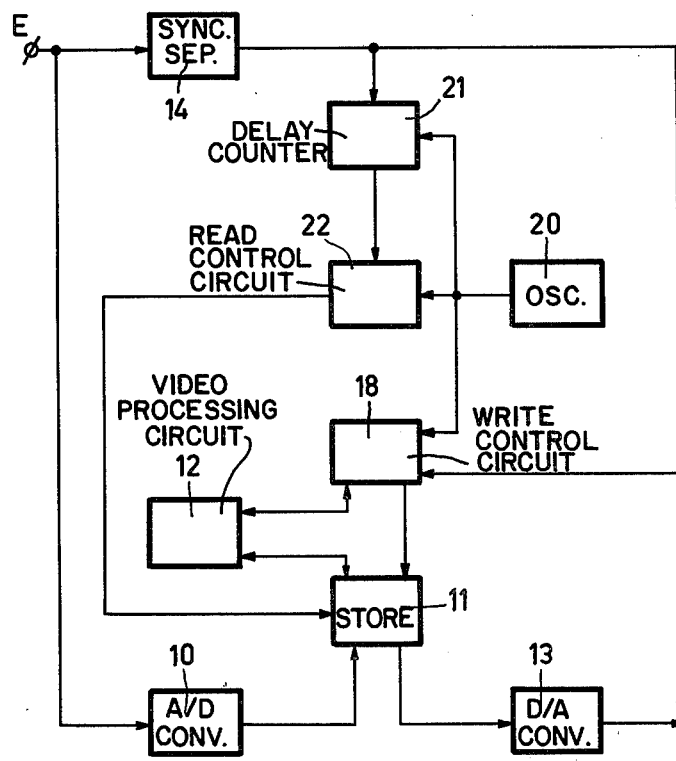
FIG. 2 shows an embodiment of the system according to the invention.

The system in accordance with the invention shown in FIG. 2, comprises the elements 10, 11, 12, 13, 14 and 18 of FIG. 1 which perform the same function as in FIG. 1. Only the clock circuit is different, it now comprises a stable oscillator 20, for example a crystal oscillator, whose output signal, with a free-running frequency F which is equal to N times the line frequency, is conveyed to a delay counter 21 and to the write control circuit 18, and also to a read control circuit 22. The delay produced by this counter 21 is equal to 64 microseconds (the duration of one line). The starting of the counter 21 and the write control circuit 18 is effected by the line synchronizing signals produced by the separator 14, while the starting of the read control circuit 22 is effected at the end of the delay produced by the counter 21, precisely 64 microseconds after passing through the write control circuit 18. From this structure of the system, it follows that any instability (or "jitter") which might affect the line synchronizing signals has no disadvantageous effect whatsoever on the quality of the ultimately obtained television picture as the video signal present at S is regained in all circumstances by reading the store 11, which is effected with a constant delay relative to the instant at which this store is written. Any shift which might affect the starting instants of the counter 21 and the write control circuit 18 also shifts in an accurately identical manner, a constant delay time excepted, the starting instant of the read control circuit 22, and no fault due to this shift will be visible any longer on display.

The present invention is of course not limited to the above-described and proposed embodiment, on the basis of which further variations may be proposed without departing from the framework or the scope of the invention. It is more specifically obvious that the delay produced by the counter 21 is not limited to the value of 64 microseconds but that this delay may have other values which are a multiple of said value; it is sufficient for this delay to be accurately equal to an integral number of times the line period.

Figure 3:
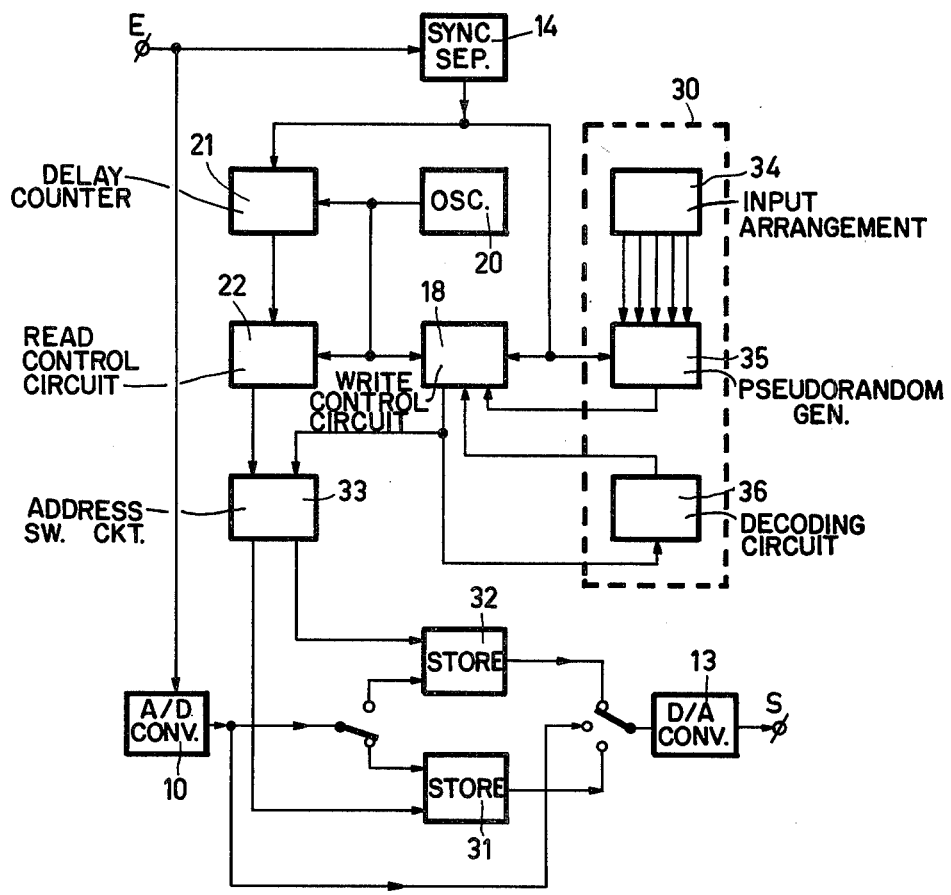
FIG. 3 shows an example how the system according to the invention is employed.

The present invention is suitable for use in coding or decoding arrangements for encoded television. FIG. 3 shows an example of such a construction: the decoding arrangement shown there comprises, as in the foregoing, the converters 10 and 13, a digital store (formed by two parallel stores 31 and 32 which are controlled by an address switching circuit 33 and which are alternately written into and read from, depending on the position of the switches, a direct connection being provided between the converters 10 and 13 during the occurrence of the line synchronizing pulses which precede the video signal), the separator 14, the oscillator 20, the write control circuit 18, the read control circuit 22 and the delay counter 21, the decoding arrangement also incorporating a circuit 30 for making the receiver able to decode coded transmissions, the circuit 30 being formed by an input arrangement 34 which is a personal input arrangement for the user, a pseudo-random generator 35 receiving the line synchronizing signal coming from the separator 14, and a decoding circuit 36. So the present invention also relates to a television receiver as described in the foregoing and incorporating such a system or a decoding arrangement incorporating in itself this system.

What is claimed is:

1. A system for digitizing and processing video signals, having a circuit for separating the line synchronizing signals from an input video signal, a digital store for storing a digital version of said input video signal, a write control circuit for controlling the writing into said store, a circuit for processing the signals in the store, and a read control circuit for controlling the reading from the store and for regaining an output video signal; characterized in that said system comprises a delay counter, having a delay equal to an integral number of times a television line period, coupled to an input of said read control circuit, and a clock circuit having an oscillator which is independent of said line synchronizing signals, an output signal of said oscillator being applied to respective clock inputs of said write control circuit, said read control circuit and said delay circuit, and said line synchronizing signals being applied to said delay counter and said write control circuit.

2. A television receiver, characterized in that it comprises a system as claimed in claim 1.

* * * * *